United States Patent [19]
Kohno et al.

[11] Patent Number: 5,455,399
[45] Date of Patent: Oct. 3, 1995

[54] SWITCH DEVICE

[75] Inventors: Hiroshi Kohno, Aichi; Toshimi Uejima, Tottori; Tetsuya Umeda, Aichi, all of Japan

[73] Assignee: Omron Corporation, Kyoto, Japan

[21] Appl. No.: 289,256

[22] Filed: Aug. 11, 1994

Related U.S. Application Data

[63] Continuation of Ser. No. 922,846, Jul. 31, 1992, abandoned.

[30] Foreign Application Priority Data

| Jul. 31, 1991 | [JP] | Japan | 3-060491 |
| Sep. 10, 1991 | [JP] | Japan | 3-072702 |
| Sep. 10, 1991 | [JP] | Japan | 3-230184 |
| Sep. 10, 1991 | [JP] | Japan | 3-230185 |

[51] Int. Cl.⁶ ..................................................... H01H 3/12
[52] U.S. Cl. ........................... 200/341; 200/345; 200/330
[58] Field of Search .................................. 200/341, 344, 200/345, 330, 557, 553, 292, 339, 296

[56] References Cited

U.S. PATENT DOCUMENTS

| 2,941,164 | 6/1960 | Lanctot | 200/553 |
| 3,225,156 | 12/1965 | Sahrbacker | 200/379 |
| 3,250,887 | 5/1966 | Sorenson | 200/339 |
| 4,386,254 | 5/1983 | Eberhardt et al. | 200/339 |

FOREIGN PATENT DOCUMENTS

| 1739065 | 2/1957 | Germany. |
| 1893169 | 5/1964 | Germany. |

OTHER PUBLICATIONS

Patent Abstract of Japan, 63 284 726, vol. 13, (Mar. 17, 1989).

Primary Examiner—Henry J. Recla
Assistant Examiner—David J. Walczak
Attorney, Agent, or Firm—Foley & Lardner

[57] ABSTRACT

A switch device of reduced thickness is provided for use in motor vehicles or the like in which a switching element in a casing is operated with an operating knob. Such a switch device can be assembled with ease and is stable in the operation of the switching element. Such a switch device may be installed both on the right side and on the left side, while employing one and the same casing, and is therefore low in manufacturing cost. In the switch device, a switching element is provided inside a casing, and is operated with an operating knob provided on the outer surface of the casing. The switching element is secured to the back of the circuit board by soldering its fixing terminals on the side of the surface of the circuit board, and a driven part of the switching element, which is operated with the operating knob, is stuck out on the side of the surface of the circuit board through an opening formed in the latter. A returning mechanism is provided on the surface of the casing at the position corresponding to the inner surface of the operating knob, and protrudes elastically to abut against the operating knob, thereby to return the latter to its original position. A pair of rocking support pins may be mounted on the outer surface of the casing at the positions which are symmetrical with respect to the middle, in the vertical direction, of the outer surface of the casing, and the operating knob will thus be rocked selectively on one of the pair of rocking support pins.

19 Claims, 6 Drawing Sheets

ROTATION CENTER

SWITCH DEVICE

This application is a continuation of application Ser. No. 07/922,846, filed Jul. 31, 1992, now abandoned.

FIELD OF THE INVENTION

This invention relates to the structure of a switch device for a motor vehicle or the like in which a switching element is operated with an operating knob and which allows greater freedom of installation placement of the switch device.

BACKGROUND

A switch device of this type has a switching element provided inside a casing which is operated with an operating knob, and when the operating knob is not operated, the switching element is restored while the operating knob is returned to its original position. The restoring of the switching element and the returning of the operating knob are achieved with elastic returning mechanisms provided therefor.

The returning mechanism for the operating knob is, in general, provided at the lower end portion of an operating member for the switching element. This operating member protrudes downwards from an operating part in such a manner that the returning mechanism is integral with the operating member. For instance, a coil spring is embedded in the lower end portion of the operating member, and a plunger is provided in such a manner that it is urged by the coil spring. The lower end portion of the plunger operates the switching element through a movable piece, and it is returned by its own elastic force while being guided by the movable piece.

Figure 7:
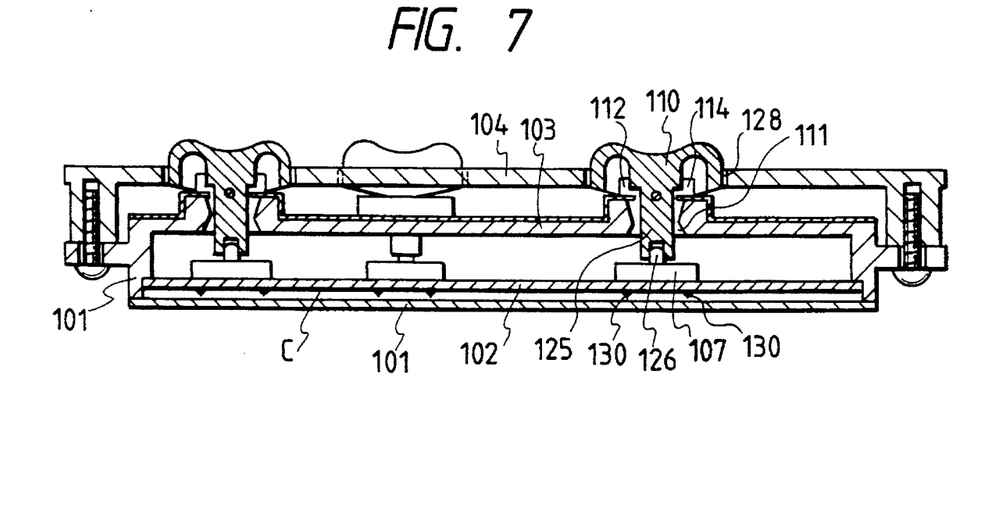
FIG. 7 is a longitudinal sectional view of a related switch device.

In FIG. 7, a related configuration is shown. Reference numeral 101 designates a lower casing. A circuit board 102 is mounted on the lower casing 101, and is covered with an upper casing 103, on which a decorative cover 104 called "bezel" is placed.

A plurality of switching elements 107 are provided on the circuit board 102. More specifically, the switching elements 107 are fixedly secured to the circuit board 102 by soldering their fixing terminals 130 which stick out on the side of the back of the circuit board through through-holes. The upper casing 103 has mounting holes 111 and pivotal supports 112 for switch operating knobs 110 at positions corresponding to those of the above-described switching elements 107. Each of the switch operating knobs 110 has an operating end portion 125 extended downwards. The operating end portion 125 is inserted into the mounting hole 111, and is swingably supported by the support 112. When the switch operating knob 110 is mounted in this way, the lower end of the operating end portion 125 is engaged with a driven part 126 of the switching element 107.

The decorative cover 104 has windows 128 to expose the switch operating knobs 110. That is, the decorating cover 104 is placed over the upper casing 103 in such a manner that the switch operating knobs 110 are positioned at the windows 128, respectively.

When, in the switch device thus constructed, the switch operating knob 110 is operated, its operating end 125 moves the driven part 126 of the switching element 107, thereby to operate the switching element 107.

In the related switch device, as described above, the switching elements 107 are secured to the circuit board 102 by soldering the fixing terminals 130 which stick out on the backside of the circuit board 102. That is, since the fixing terminals protrude from the back of the circuit board 102, it is necessary to provide a clearance C on the backside of the circuit board 102 in an amount equal to the length of protrusion of the fixing terminals, and the thickness of the switch device is increased by as much. In the case of a switch device for a motor vehicle or the like, a space for installation of the switch device is limited. Hence, there has been a strong demand for provision of a switch device which is compact, and small particularly in thickness.

In a switch device for a power seat mounted on a motor vehicle, in order to slide the whole seat back and forth, or to move the front or rear end of a seat cushion vertically, one switch knob is slid parallel or turned about an axis.

Figure 8:
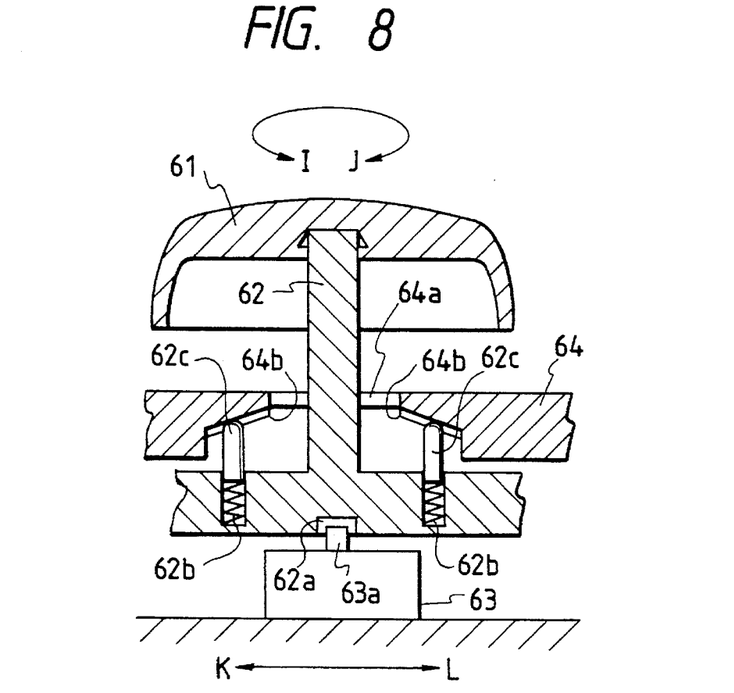
FIG. 8 is a sectional view showing a related switch device including a switch mechanism which is turned on and off with rotation of a switch knob.

FIG. 8 shows a part of another related switch device which includes a switch mechanism 63 which is turned on and off with a switch knob 61. The switch knob 61 is turned in the directions of the arrows I and J, so that a drive piece 62 connected fixedly to the switch knob 61 is turned in the same way, to operate the switch mechanism 63.

For this purpose, a substantially circular hole 64a is formed in a body casing 64 so as to permit the rotation of the drive piece 62, and a groove 62a is formed in the lower surface of the base of the drive piece 62 to transmit the motion of the drive piece 62 to a movable piece 63a of the switch mechanism 63. The groove 62a has a so-called relief so that the movable piece 63a can move linearly in the directions of the arrows K and L.

In order to guide the drive piece 62 and to return the switch knob 61 to the initial position, plungers 62c are elastically supported on the upper surface of the base of the drive piece by springs 62b, while V-grooves 64b are formed in the rear surface of the body casing 64 in such a manner that they are inclined towards the drive piece 62. The V-grooves 64b thus guide the plungers 62c. When the drive piece 62 is turned, it is allowed to return to the original neutral position with the aid of the plungers 62c thus elastically supported.

In the related switch device, as described above, the V-grooves 64b for returning the drive piece 62 are cut in the rear surface of the body casing so that they are inclined, and the plungers 62c supported elastically by the springs 62b are provided below the V-grooves 64b. Hence, the switch device suffers from difficulties that the body casing 64 is unavoidably large in thickness, and the installation of the switch device is limited in place.

Further, in a motor vehicle, a seat switch for a driver's seat is installed, for example, on the right side of the seat, and a seat switch for a passenger side seat is installed on the left side of the seat. These two seat switches are unavoidably different in the configuration of their casings from each other because the way of installing the seat switch on the right side of the seat is different from that of installing the seat switch on the left side of the seat, although their bodies are the same. That is, it is necessary to use two different types of casings which substantially determine the external forms of the seat switches. As a result, the manufacturing cost is increased.

SUMMARY OF THE INVENTION

In the case described above, the returning mechanism is provided at the lower end of the operating member, and it is located inside the casing. Therefore, the thickness of the casing is increased by the height of the returning member.

This makes it difficult to decrease the thickness of the switch device.

In the above-described switch device, the plunger forming the returning mechanism serves also as a switch operating end. Hence, the switch device is complicated in construction and difficult to assemble, and in addition, the switching element is unstable in operation. Further, the related switch device has limited installation placement alternatives.

In view of the foregoing, an object of this invention is to provide a switch device which is smaller in thickness than the related device, which can be readily assembled and which is stable in the operation of the switching element.

The foregoing object of the invention has been achieved by the provision of a switch device in which a switching element is provided inside a casing, and is operated with an operating knob provided on the outer surface of the casing. According to the instant invention, a returning mechanism is provided on the outer surface of the casing at the position corresponding to the inner, rear surface of the operating knob. This returning mechanism has an elastic support member to force the returning mechanism to abut against the knob to thereby return the knob.

The foregoing object of the invention may also be achieved by the provision of a switch device in which a switching element is mounted on a circuit board in a casing, and is operated with an operating knob provided on the outer surface of the casing. According to the instant invention, the switching element is secured to the back of the circuit board by soldering its fixing terminals on the side of the surface of the circuit board, and a driven part of the switching element, which is operated with the operating knob, is stuck out on the side of the surface of the circuit board through an opening formed in the latter.

A further object of this invention is to provide a switch device in which the body casing is greatly reduced in thickness, and which is not limited in place when installed.

The foregoing object of the invention has been achieved by the provision of a switch device in which the motion of a swingable switch knob is transmitted to a movable piece of a switch mechanism provided in a switch body, and the switch mechanism is turned on and off by the linear reciprocating motion of the movable piece. This switch device includes a pair of knob pawls formed on the rear surface of the switch knob in such a manner as to clamp a drive piece. The drive piece has an upper end portion clamped by the pair of knob pawls and a lower end portion coupled to the movable piece of the switch mechanism, and has two curved opposing walls on the upper end portion which are brought into contact with the pair of knob pawls. A guide groove is formed straight in the upper surface of the switch body, so that the drive piece moves in association with the linear reciprocating motion of the movable piece. A plate touch member is formed on the rear surface of the switch knob, and has a V-groove in its surface facing the switch body. A knob returning mechanism is provided on the upper surface of the switch body, to return the switch knob to the neutral position with the end of a plunger supported elastically by a compression spring engaged with the V-groove of the plate touch member.

A further object of this invention is to provide a switch device which may be installed both on the right side and on the left side, yet employs one and the same casing, and is therefore low in manufacturing cost.

The foregoing object of the invention has been achieved by the provision of a switch device in which a switching element is provided inside a casing, and it is operated with an operating knob which is rockably mounted on the outer surface of the casing; in which, according to the invention, a pair of rocking support pins are mounted on the outer surface of the casing at the positions which are symmetrical with respect to the middle, in the vertical direction, of the outer surface of the casing, and the operating knob rocks selectively on one of the rocking support pins in the pair.

BRIEF DESCRIPTION OF THE DRAWINGS

The invention will be described in further detail with reference to the accompanying drawings, wherein:

FIG. 15 is an explanatory view, part (a) of which shows how a drive piece operates when a switch knob is reciprocated linearly and part (b) of which shows how a drive piece operates when a switch knob is swung.

DETAILED DESCRIPTION OF THE PREFERRED EMBODIMENTS

Figure 1:
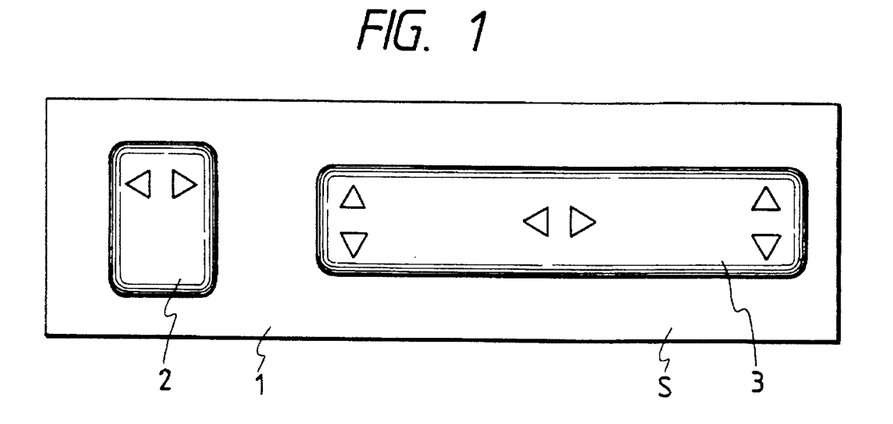
FIG. 1 is a front view showing a switch device according to an embodiment of the present invention.
Figure 2:
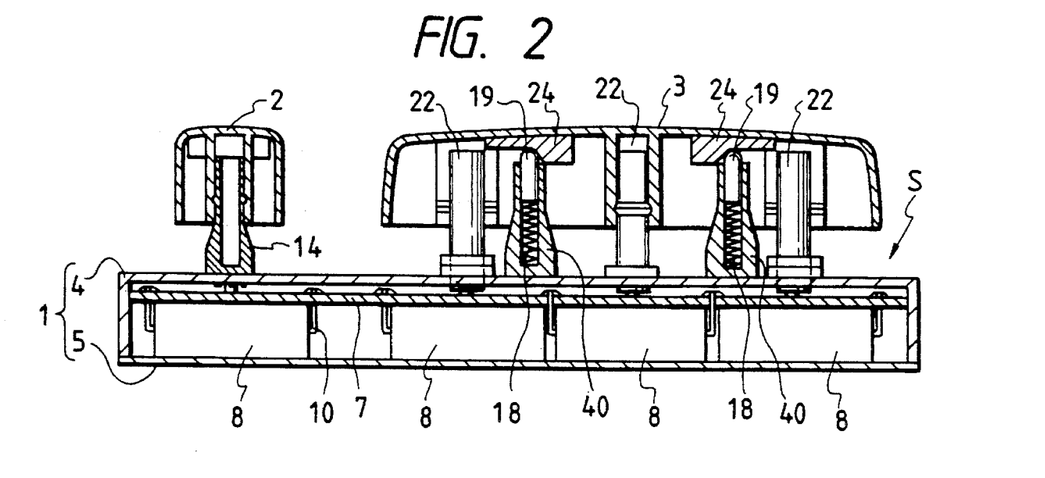
FIG. 2 is a longitudinal sectional view of the switch device in FIG. 1.

FIG. 1 is a front view showing a seat switch S having a switch device according to the instant invention, and FIG. 2 is a longitudinal sectional view of the seat switch S.

The seat switch S is installed beside a seat of a motor vehicle (the seat switch shown in FIG. 1 is to be installed on the left side of the seat). The seat switch S comprises: a casing 1; and a small operating knob 2 and an elongated large operating knob 3, which are provided on the front part and the rear part of the outer surface of the casing 1, respectively. The operating knob 2 is pivotally supported at the lower end, so that the operating knob 2 may be swung. When the upper end portion of the operating knob 2 is swung forwards and backwards, the seat back is inclined forwards and backwards. On the other hand, the operating knob 3 is moved back and forth to move the seat back and forth, and the front end and the rear end thereof are swung upwards and downwards to swing the front end and the rear end of the seat upwards and downwards.

Further in FIG. 2, reference numeral 4 designates an upper casing, and 5, a lower casing. The upper casing 4 and the lower casing 5 form the casing 1. A circuit board 7 is provided close to the inner surface of the upper casing 2 of the casing 1. Switching elements 8 are mounted on the inner (lower) surface of the circuit board 7, in such a manner that one switching element 8 is provided for the operating knob 2 and three switching elements 8 are provided for the operating knob 3.

Figure 3:
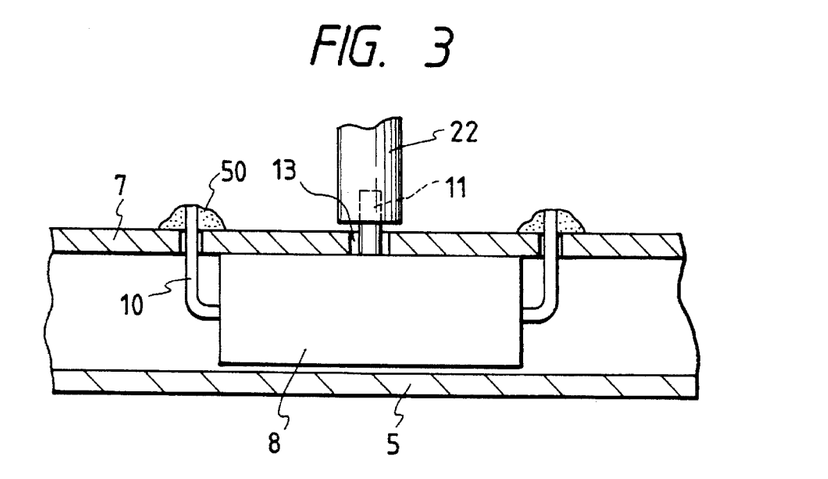
FIG. 3 is an enlarged-longitudinal sectional view showing a major part of the switch device in FIG. 1.

The switching elements 8 are secured to the circuit board 7 as shown in FIG. 3. That is, fixing terminals 10 extended from both sides of the switching element 8 are bent towards the circuit board 7, and then stuck out on the side of the surface of the latter's through-holes. The fixing terminals 10, thus stuck out, are soldered on the side of the surface of the circuit board 7 as indicated at 50. The space over the surface of the circuit board, into which the fixing terminals 10 are stuck out, is utilized as a space for allowing the protrusion of a driven part 11 of the switching element 8. The lower casing 5 is set close to the bottoms of the switching elements 8. Hence, the seat switch is smaller in the thickness of the casing than the related switch.

The circuit board 7 has openings 13 at positions which correspond to the positions of the switch elements 8, so that the driven parts of the switch elements protrude above the surface of the circuit board 7 through the openings 13. The upper casing 4 has openings 12 at the positions corresponding to those of the above-described openings 13 of the circuit board 7.

Figure 4:
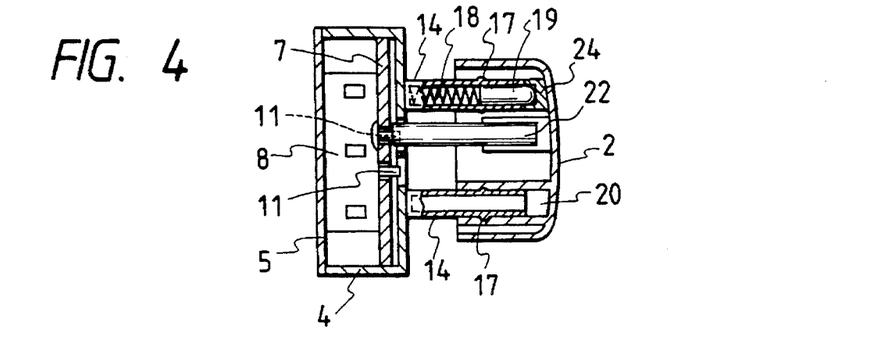
FIG. 4 is a vertical sectional view showing the switch device in FIG. 1.

The front switch device provided with the operating knob 2 will now be described. FIG. 4 is a vertical sectional view of the operating knob 2.

Figure 5:
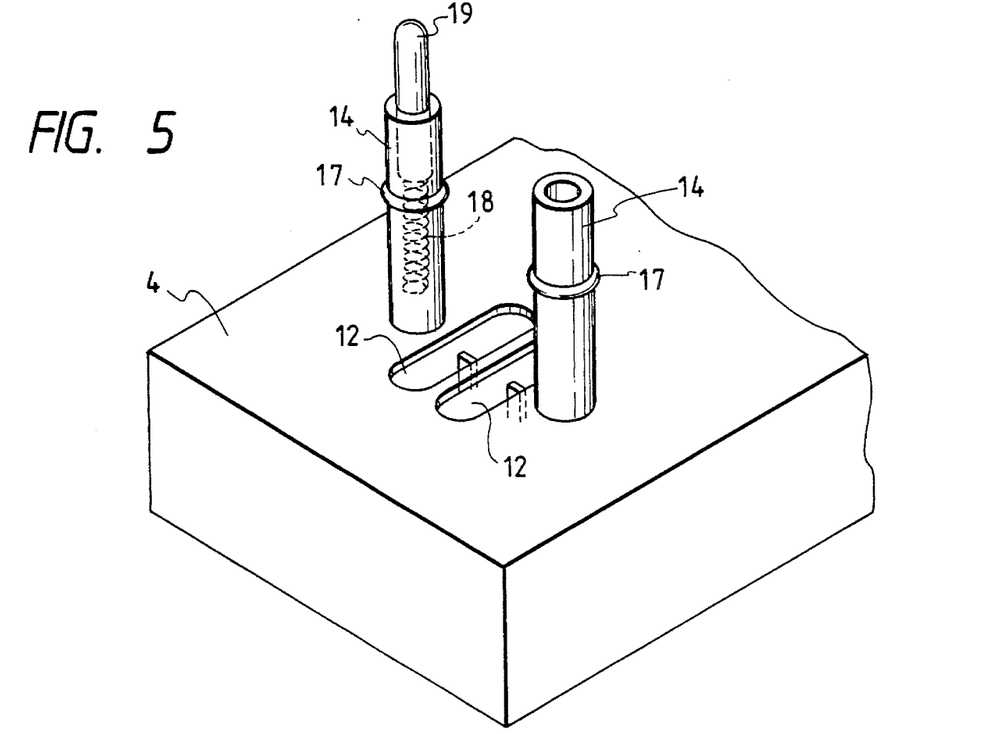
FIG. 5 is a perspective view showing a major part of the switch device in FIG. 1.

As shown in FIG. 5, two cylindrical rocking support pins 14 are mounted on the upper casing 4, on which the operating knob 2 is provided, in such a manner that one of the pins 14 is located above the other in FIG. 4. Two elongated openings 12 are formed between the two pins 14. A fixing ring 17 is formed on the outer cylindrical surface of each of the pins 14. In the upper support pin 14, a plunger 19 is supported on a coil spring 18. The operating knob 2 has an engaging cylindrical recess 20 inside it, and it is swingably mounted with the lower support pin 14 inserted into the engaging cylindrical recess 20. An operating pin 22 for operating switching element 8 is inserted into the inner surface of the operating knob 2, in such a manner that it is extended through the opening 12 which is located farther from the support side of the operating knob than the other opening 12 and its end is engaged with the driven part 11 of the switch 8.

Figure 6:
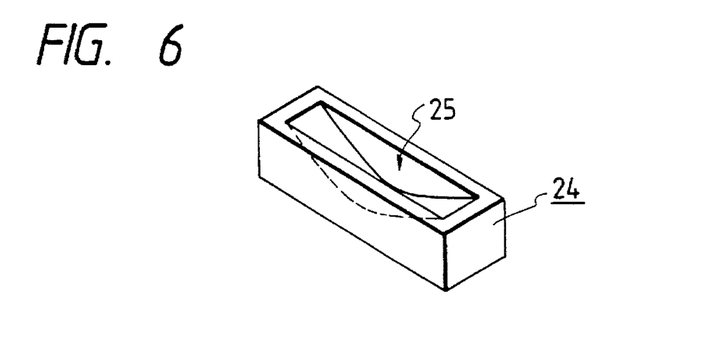
FIG. 6 is a perspective view showing a major part of the switch device in FIG. 1.

A plate-shaped touch member 24, as shown in FIG. 6, is provided on the inner surface of the operating knob 2 so that the plunger 19 is brought into contact with the knob 2 through the touch member 24. The touch member 24, being made of nylon resin or the like, slides easily. The touch member 24 has a horizontally extended groove 25, with which the upper end portion of the plunger 19 is engaged. The bottom of the groove 25 is so curved that it is deepest at the middle. Hence, when no force is applied to the operating knob 2, the upper end portion of the plunger 19 is returned to the middle of the elongated groove 25 by the elastic force of the coil spring 18, so that the operating knob 2 is returned to the initial position. That is, a mechanism for returning the operating knob 2 is provided inside the operating knob 2 independently of the operating knob 2 and outside the casing 1, with the coil spring 18 and the plunger 19 being held in the support pin 14. This allows use of a thinner casing than would be possible with related approaches.

One of the two rocking support pins 14 formed on the upper casing 4 is selectively employed as support means, and the other pin 14, which is not used as support means, forms the aforementioned operating knob returning mechanism. The upper casing 4 has the two openings 12 as was described above, and the switching element 8 has two driven parts 11 in correspondence to the two openings 12, so that the switching element 8 is operated no matter which of the support pins 14 supports the operating knob 2. The seat switch S should be provided for both sides of the seat; that is, it is necessary to provide two types of seat switches S; one to be installed on the right side of the seat, and the other to be installed on the left side. In this case, the two support pins 14 are provided in such a manner that one is located above the other as was described above, and the midpoint of the distance between the two support pins 14 coincides with the middle, in the vertical direction, of the upper casing 4. The remaining part of the upper casing 4 is so formed that the upper and lower halves thereof are symmetrical. The upper casing 4 thus formed can be used for the both types of seat switches S.

The rear switch device will now be described in brief.

The rear switch device has three operating pins 22 which protrude inside the operating knob 3 in such a manner that they are arranged in the longitudinal direction. Two cylindrical bosses 40 protrude from the outer surface of the upper casing 2. In each of the cylindrical bosses 40, a coil spring 18 and a plunger 19 are set, in such a manner that, similarly as in the above-described front switch device, the outer end portion of the plunger 19 is abutted against a touch member 24 provided on the inner surface of the operating knob 3. Thus, the plungers 19 are elastically abutted against the respective touch members 24 so that the operating knob 3 is returned to the original position.

In the switch device of the invention as constructed above, the mechanism for returning the operating knob is not provided inside the casing; rather, it is provided on the outer surface of the casing so that it is located on the side of the inner surface of the operating knob, and therefore the thickness of the casing is reduced by as much. Accordingly, the switch device is, in its entirety, smaller than the related device.

Furthermore, since the operating knob returning mechanism is provided independently of the operating member of the switching element, the switch device is simple to assemble, and the switching element is stable in operation.

In the switch device of the invention as constructed above, the operating knob rocks selectively on one of the pair of rocking support pins which are mounted on the outer surface of the casing at the positions which are symmetrical with respect to the middle, in the vertical direction, of the outer surface of the casing. Therefore, the switch device to be installed on the right side and the switch device to be installed on the left side may have one and the same casing.

As was described above, in the switch device according to the invention, the switching element is secured to the back of the circuit board by soldering its fixing terminals on the side of the surface of the circuit board, the driven part of the switching element, which is operated with the operating knob, is stuck out on the side of the surface of the circuit board through the opening formed in the latter. Thus, in the switch device of the invention, the space provided above the surface of the circuit board, into which the fixing terminals of the switching element are inserted, is used for allowing the protrusion of the driven part of the switching element. This means that in the switch device of the invention, unlike the related device, the fixing terminals are not stuck out on the backside of the circuit board. Hence, the switch device is smaller in thickness than the related device by as much as the amount of protrusion of the fixing terminals from the circuit board.

An example of a switch device, which constitutes another embodiment of this invention, will be described with reference to FIGS. 9–15. This embodiment provides a different returning mechanism than described above, which is still located on the inner surface of the operating knob.

Figure 9:
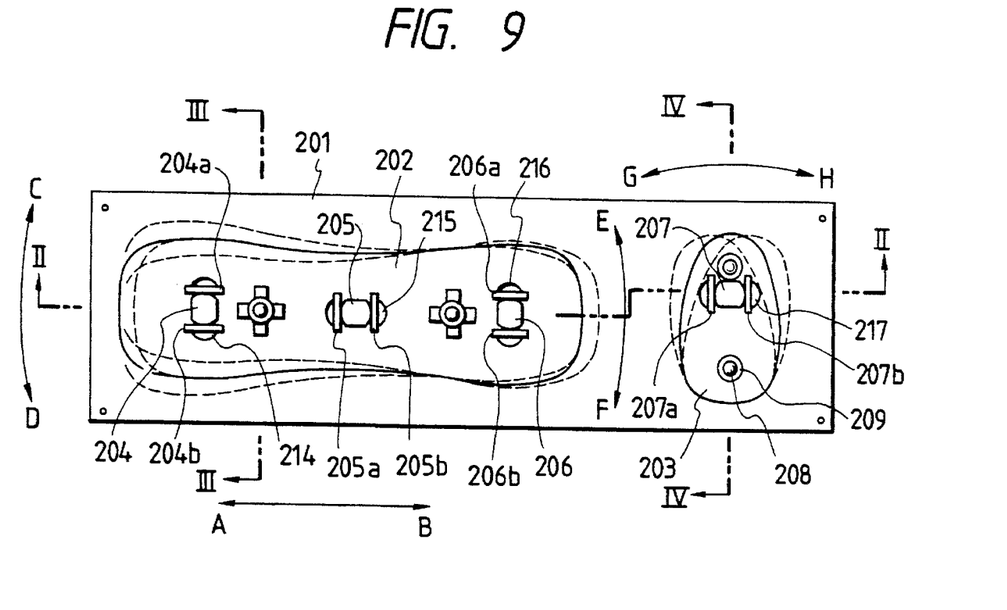
FIG. 9 is a top view showing a switch device which is provided for a power seat in an automotive vehicle according to another embodiment of the present invention.

FIG. 9 is a top view showing the switch device which is provided for a power seat in a motor vehicle. Two turning switch knobs 202 and 203 are mounted on the upper surface of a switch body 201, and elongated guide grooves 214 through 217 for guiding drive pieces 204 through 207 respectively are formed in the upper surface of the switch body 201, so that the rotations of the switches 202 and 203 are transmitted, as linear reciprocating motions, to micro switches (hereinafter referred to as "switch mechanisms" when applicable) provided in the switch body 201.

The switch knob 202 is reciprocated linearly in the directions of the arrows A and B, to instruct the respective switch mechanism (described later) to operate to slide the whole seat back and forth. The switch knob 202 is swung in the directions of the arrows C and D, to instruct the respective switch mechanism to operate to move the front end of the seat cushion upwards and downwards; and it is swung in the directions of the arrow E and F, to instruct the respective switch mechanism to operate to move the rear end of the seat cushion upwards and downwards. For this purpose, pairs of knob pawls 204a and 204b, 205a and 205b, and 206a and 206b, which hold the drive pieces 204, 205 and 206, respectively, are formed on the rear surface of the switch knob 202 in such a manner that they are integral with the switch knob 202 (cf. FIG. 10). Those drive pieces 204, 205 and 206 are to transmit the above-described motions of the switch knob 202 to the movable pieces (described later) of the switch mechanisms.

On the other hand, the switch knob 203 is swung about a shaft 208 in the directions of the arrows G and H which protrudes from the upper surface of the switch body 201, to instruct the respective switch mechanism to operate to perform a reclining function; i.e., to change the angle of inclination of the seat back. For this purpose, a pair of knob pawls 207a and 207b holding the drive piece 207 adapted to transmit the motions of the switch knob 203 to the movable piece (described later) of the respective switch mechanism, and a cylinder 209 rotatably mounted on the protruded shaft 208 are formed on the rear surface of the switch knob 203 in such a manner that they are integral with the latter (cf. FIG. 12).

In FIG. 9, the broken lines indicate the movements of the switch knobs 2 and 3.

Figure 10:
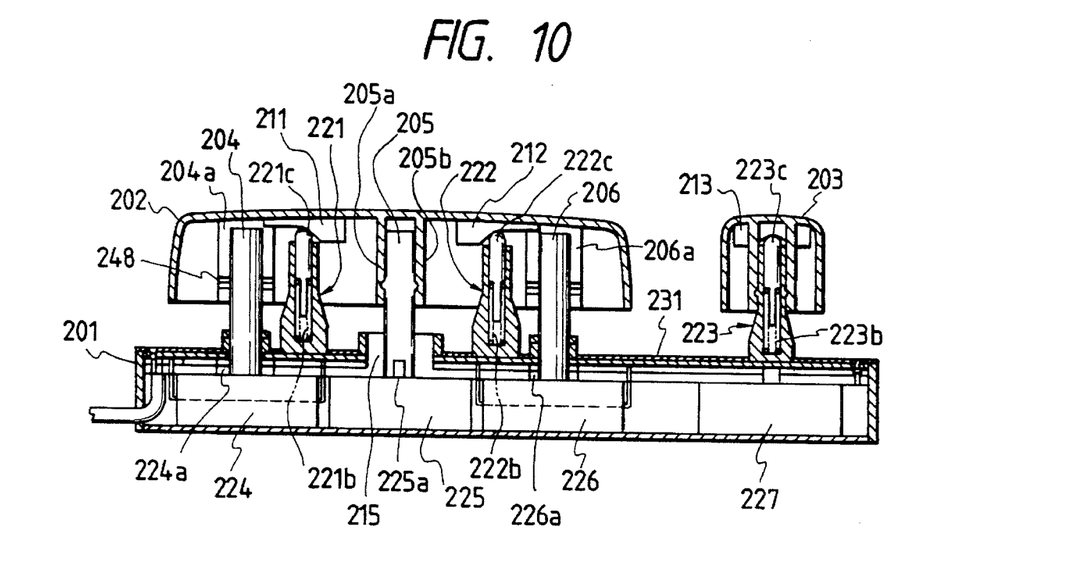
FIG. 10 is a sectional view taken along line II—II in FIG. 9.
Figure 11:
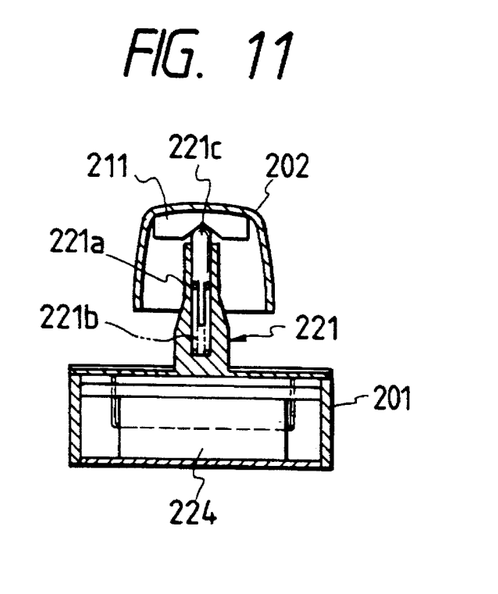
FIG. 11 is a sectional view taken along line III—III in FIG. 9.
Figure 12:
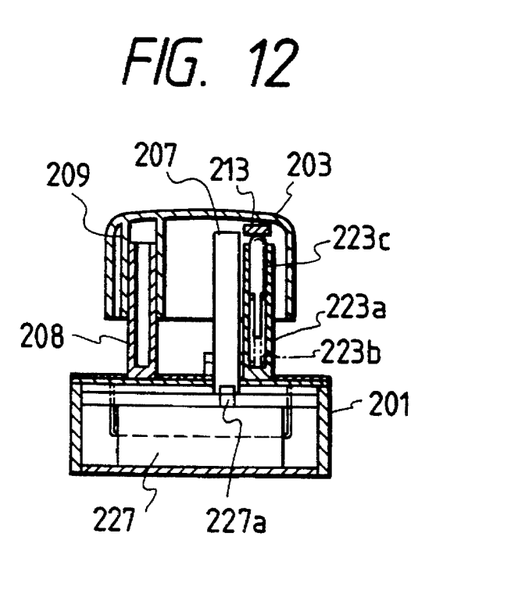
FIG. 12 is a sectional view taken along line IV—IV in FIG. 9.

FIGS. 10, 11 and 12 are sectional views taken along lines II—II, III—III and IV—IV in FIG. 9, respectively.

As shown in those figures, in the switch body 201, the aforementioned switch mechanisms 224, 225 and 226 are provided below the switch knob 202, and the switch mechanism 227 is provided below the switch knob 203. The aforementioned movable pieces 224a through 227a are protruded from the switch mechanisms 224 through 227, respectively, and are coupled to the above-described drive pieces 204 through 207, respectively. The movable pieces 224a through 227a are reciprocated linearly to operate the switch mechanisms 224 through 227, respectively. Knob returning mechanisms 221 and 222 for returning the switch knob 202, and a knob returning mechanism 223 for returning the switch knob 203 are provided on the upper surface of the switch body casing 201. The knob returning mechanisms 221, 222 and 223 have plungers 221c, 222c and 223c, and cylinders 221a, 222a and 223a which are integral with the switch body casing, respectively. Those plungers 221c, 222c and 223c are elastically supported in cylinders 221a, 222a and 223a by compressions springs 221b, 222b and 223b, respectively, in such a manner that the plungers 221c, 222c and 223c are protruded from above the cylinders 221a, 222a and 223a, respectively.

In addition to the above-described knob pawls 205a, 205b, . . . , plate touch members 211, 212 and 213 are provided above the knob returning mechanisms 221, 222 and 223 on the rear sides of the switch knobs 202 and 203, respectively. The plate touch members 211, 212 and 213 have V-grooves so as to push the outer ends of the plungers with the aid of the motions of the switch knobs 202 and 203.

The V-groove of the plate touch member 211 is so shaped that, when the switch knob 202 is moved in the direction of the arrow A and swung in the directions of the arrows C and D in FIG. 9, the switch knob is returned to the neutral position as shown in FIG. 10. The V-groove of the plate touch member 212 is shaped so that the switch knob 202 is returned to the neutral position when swung in the directions of the arrows E and F and moved in the direction of the arrow B (cf. FIGS. 10 and 11).

The V-groove of the plate touch member 213 is shaped so that the switch knob 203 is returned to the neutral position when swung in the directions of the arrows G and H (cf. FIG. 10). In order to prevent dust or water drops from entering the switch body 201, the upper surface of the switch body 201 is covered with a sealing rubber sheet 231 which has windows at positions corresponding to those of the knob returning mechanisms 221, 222 and 223 and the guide grooves 214, 215, 216 and 217.

Figure 13:
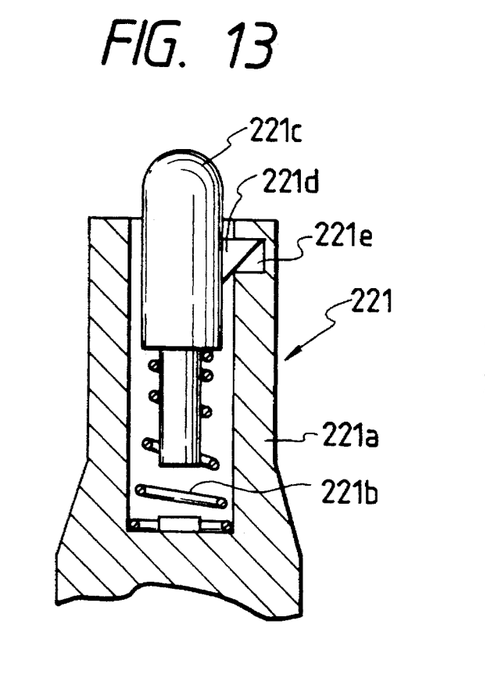
FIG. 13 is a sectional view showing the detailed structure of a knob returning mechanism in FIG. 9.

FIG. 13 shows the structure of the knob returning mechanism 221 in more detail. The plunger 221c is elastically supported in the cylinder 221a by the compression spring 221b. In order to prevent the plunger 221c from coming off, a retaining pawl 221d is formed on the side wall of the plunger 221c. The lower surface of the retaining pawl 221d is sloped so as to permit the downward movement of the retaining pawl 221d. In order to lock the retaining pawl 221d, a locking groove 221e is formed in the inner wall of the cylinder 221a. The other knob returning mechanisms 222 and 223 are the same in structure as the above-described knob returning mechanism 221.

As described above, in the switch device of this embodiment of the invention, as shown in FIGS. 9 through 13, the plate touch members 211, 212 and 213 for returning the switch knobs 202 and 203, and plungers 221c, 222c and 223c elastically supported by the compression springs 221b, 222b and 223b are provided in the space between the upper surface of the switch body 201 and the rear surfaces of the switch knobs 202 and 203. Thus, the space below the rear surfaces of the switch knobs 202 and 203 is effectively utilized. Since it is unnecessary to provide the plate touch members and the plungers inside the switch body 201, the thickness of the switch body 201 can be reduced by as much.

Figure 14:
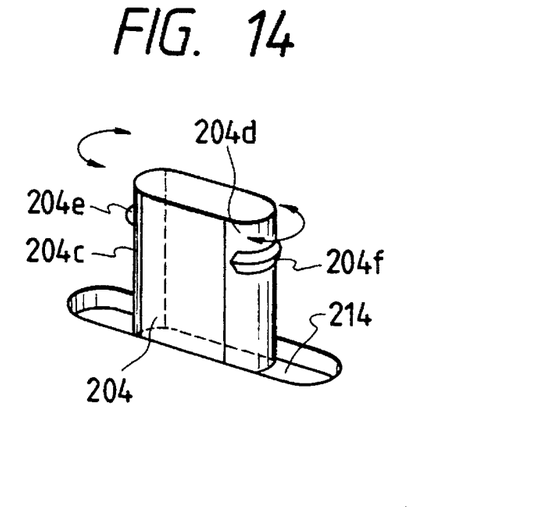
FIG. 14 is a perspective view showing a drive piece sticking out through a guide groove in FIG. 9.

FIG. 14 is a perspective view showing the drive piece 204 sticking out through the guide groove 214. Two opposing sides of the drive piece 204 which are in contact with the wall of the guide groove 214 are flat, and the remaining two opposing sides of the drive piece 204 which are brought into contact with the knob pawls 204a and 204b on the rear surface of the switch knob 202 are formed into curved walls 204c and 204d (cf. FIG. 9).

Drive piece pawls 204e and 204f are formed on the curved walls 204c and 204d, respectively, to position the drive piece in place in a vertical direction. The knob pawls 204a and 204b on the rear surface of the switch knob 202 which are brought into contact with the curved walls 204c and 204d have knob grooves 204g, which are engaged with the drive piece pawls 204e and 204f (cf. FIG. 10). Similarly, the remaining drive pieces 205, 206 and 207 have the curved walls, and the drive piece pawls which are engaged with the knob pawl grooves.

The operation of the switch knob 202 in the switch device thus constructed will be described with reference to FIG. 15.

Figure 15A:
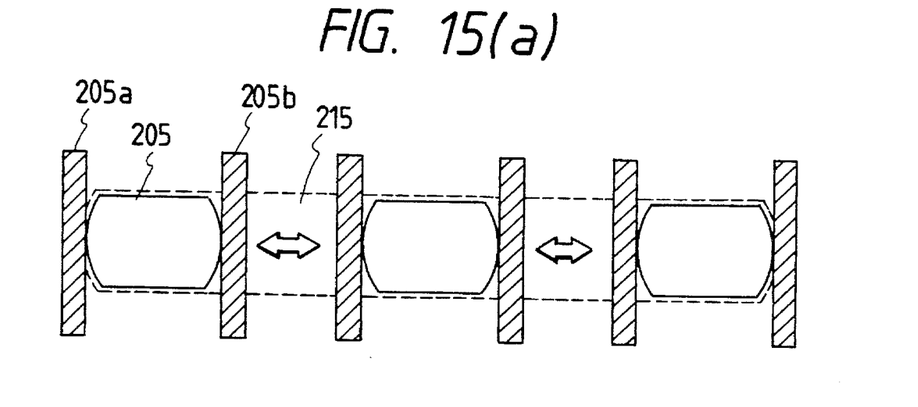
Figure 15B:
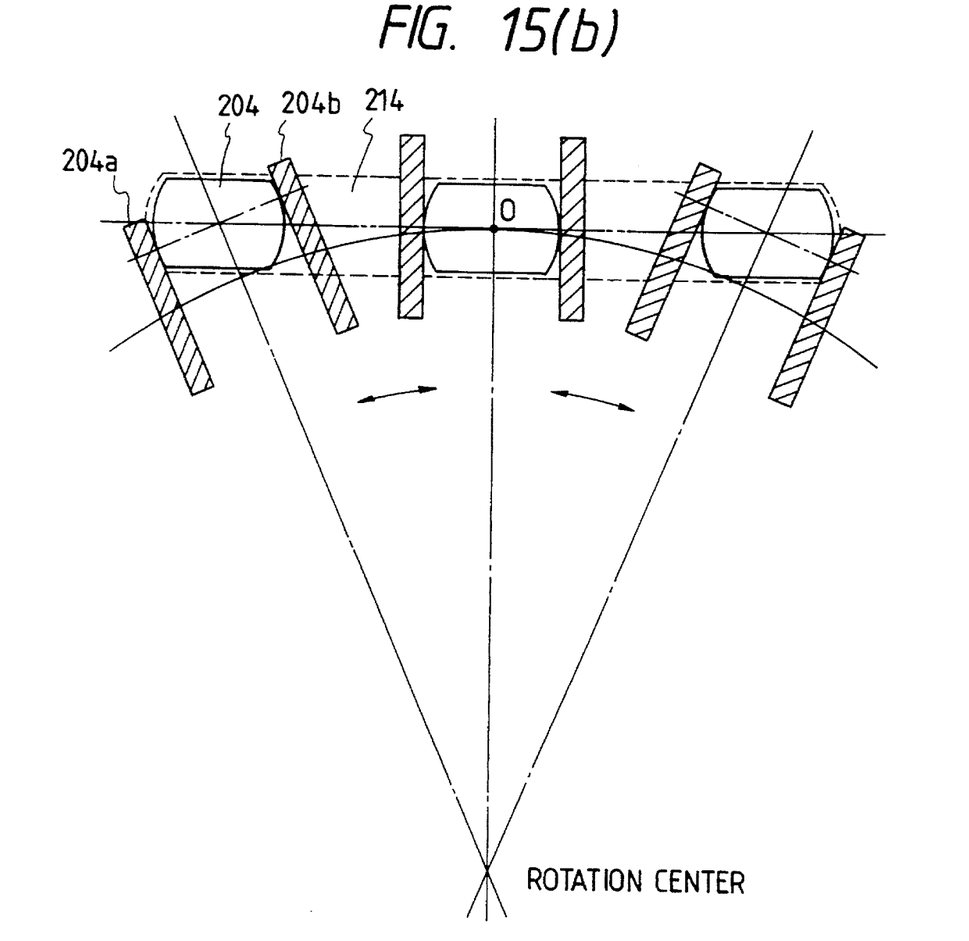

The part (a) of FIG. 15 shows how the drive piece 205 operates when the switch knob 202 is reciprocated linearly in the directions of the arrows A and B, and the part (b) of FIG. 15 shows how the drive piece 204 operates when the switch knob 202 is swung in the directions of the arrows C and D. The detailed construction for the other drive pieces, 206 and 207, is not shown, but is identical and will be treated as such below.

As is apparent from FIG. 15, since the drive pieces 204 through 207 have the curved walls 204c and 204d through 207c and 207d which are in contact with the knob pawls 204a and 204b through 207a through 207b, respectively, the curved walls 204c and 204d through 207c and 207d are brought into contact with the knob pawls 204a and 204b through 207a and 207b, respectively, each at one point. Therefore, in the switch device of the invention, no matter what angle of rotation the switch knob 202 has, the holding force is constant.

As described above, in the switch device of an embodiment of the invention, the V-grooves for returning the switch knobs and the plungers supported elastically by the compression springs are provided in the space between the upper surface of the switch body and the rear surfaces of the switch knobs. That is, the V-grooves and the plungers are not provided inside the switch body, and the thickness of the switch body is therefore reduced by as much.

In addition, the two opposing walls of each of the outer end portions of the drive pieces are curved, so that the curved walls are brought into contact with the knob pawls, respectively, each at one point. Hence, no matter what angle of rotation the switch knob has, the holding force remains unchanged.

Other designs within the spirit and scope of the invention will be apparent to those skilled in the field after receiving the above teachings. The invention, therefore, is defined with reference to the following claims.

What is claimed is:

1. A switch device comprising:

a casing;

a switching element, provided inside said casing;

a knob provided on an outer surface of said casing, operating said switching element;

a knob returning mechanism, provided between said outer surface of said casing and a rear surface of said knob and being slidable on said rear surface of said knob, to return said knob to an original position;

a plate touch member formed on said rear surface of said knob, having a V-groove curved surface facing said casing;

a plunger engagable with said V-groove curved surface of said plate touch member; and a spring supporting said plunger, a distal end of said plunger engaging said curved surface when said spring is depressed.

2. A switch device as recited in claim 1, wherein said spring and said plunger are mounted within a support pin formed in said casing.

3. A switch device as recited in claim 1, wherein said knob is connected to said switching element through a movable piece provided in said casing.

4. A switch device as recited in claim 3, wherein said knob is swingable and said switch element is turned on and off by said movable piece moving in a linear reciprocating manner.

5. A switch device as recited in claim 4, further comprising:

a pair of knob pawls formed on the rear surface of said knob; and a drive piece having an upper end portion clamped by said pair of knob pawls and a lower end portion coupled to said movable piece.

6. A switch device as recited in claim 5, wherein said upper end portion of said drive piece has two curved opposing walls in contact with said pair of knob pawls.

7. A switch device as recited in claim 6, further comprising:

a guide groove formed straight in the upper surface of said casing to guide said drive piece in association with said linear reciprocating motion of said movable piece.

8. A switch device as recited in claim 7, further comprising:

a plate touch member formed on said rear surface of said knob, having a V-groove facing said casing.

9. A switch device comprising:

a casing;

a circuit board provided in said casing;

a switching element mounted on said circuit board and having fixing terminals;

an operating knob, provided on an outer surface of said casing, operating said switching element, wherein said switching element is secured to a backside of said circuit board by soldering said fixing terminals on a top side of said circuit board; and a driven part of said switching element, which is operated by said operating knob, protruding from said top side of said circuit board through an opening formed in said circuit board.

10. A switch device as recited in claim 9, further comprising a knob returning mechanism, provided between said outer surface of said casing and a rear surface of said operating knob, to return said operating knob to an original position.

11. A switch device adapted to be mounted in one of several different selected locations comprising:

a casing;

a switching element provided inside said casing;

an operating knob, swingably mounted on an outer surface of said casing and operatively connected to said switching element;

a pair of support pins mounted on an outer surface of said casing at symmetric positions with respect to a middle portion of said casing, each adapted to rotatably support said operating knob in a normal direction to said outer surface of said casing, wherein said operating knob is rotatably mounted on a selected one of said support pins in said pair depending on said selected location.

12. A switch device as recited in claim 11, further comprising a knob returning mechanism, provided between said outer surface of said casing and a rear surface of said operating knob, to return said operating knob to an original position.

13. A switch device as recited in claim 12, wherein said returning mechanism is provided on the other of said rocking support pins of said pair.

14. A switch device comprising:

a casing;

a switching element, provided inside said casing;

a knob provided on an outer surface of said casing, operating said switching element;

a knob returning mechanism, provided between said outer surface of said casing and a rear surface of said knob, to return said knob to an original position, a pair of knob pawls formed on the rear surface of said knob;

a drive piece having an upper end portion clamped by said pair of knob pawls and a lower end portion coupled to a movable piece;

wherein said knob is connected to said switching element through said movable piece provided in said casing, wherein said knob is swingable and said switching element is turned on and off by said movable piece moving in a linear reciprocating manner, and wherein rotation of said knob in a plane parallel to said outer surface of said casing is converted into linear motion of said moveable piece in said plane parallel to said outer surface of said casing.

15. A switch device as recited in claim 14, wherein said upper end portion of said drive piece has two curved opposing walls in contact with said pair of knob pawls.

16. A switch device as recited in claim 15, further comprising:

a guide groove formed straight in the upper surface of said casing to guide said drive piece in association with said linear reciprocating motion of said movable piece.

17. A switch device as recited in claim 16, further comprising:

a plate touch member formed on said rear surface of said knob, having a V-groove facing said casing.

18. A switch device as recited in claim 17, wherein said knob returning mechanism comprises:

a plunger engaged with said V-groove of said plate touch member; and a spring supporting said plunger.

19. A switch device comprising:

a casing;

a switching element, provided inside said casing;

a knob provided on an outer surface of said casing, operating said switching element; and a knob returning mechanism, provided between said outer surface of said casing and a rear surface of said knob, to return said knob to an original position, wherein said knob is connected to said switching element through a movable piece provided in said casing, said moveable piece and said knob being coupled to each other such that said moveable piece is linearly moveable in a first direction and said knob is rotatable about said moveable piece and moveable linearly in a second direction perpendicular to said first direction without motion of said moveable piece.

* * * * *